(12) United States Patent
Van Liew et al.

(10) Patent No.: US 8,141,468 B2
(45) Date of Patent: Mar. 27, 2012

(54) ADJUSTABLE BOMB CARRIER

(75) Inventors: Jeffrey W. Van Liew, Brownsburg, IN (US); Robert A. Bailey, Avon, IN (US)

(73) Assignee: Raytheon Company, Waltham, MA (US)

( * ) Notice: Subject to any disclaimer, the term of this patent is extended or adjusted under 35 U.S.C. 154(b) by 295 days.

(21) Appl. No.: 12/405,306

(22) Filed: Mar. 17, 2009

(65) Prior Publication Data
US 2010/0236390 A1    Sep. 23, 2010

(51) Int. Cl.
*B64D 1/04*    (2006.01)
(52) U.S. Cl. .................... 89/1.54; 244/137.4
(58) Field of Classification Search ............ 89/1.51, 89/1.54; 244/137.4, 137.1, 136
See application file for complete search history.

(56) References Cited

U.S. PATENT DOCUMENTS

| | | | | |
|---|---|---|---|---|
| 3,122,056 A | * | 2/1964 | Fitch et al. ................. | 89/1.51 |
| 3,468,501 A | * | 9/1969 | Baum ....................... | 244/137.4 |
| 3,771,416 A | * | 11/1973 | Ackerman et al. ............ | 89/1.51 |
| 4,155,286 A | * | 5/1979 | Mihm ....................... | 89/1.819 |
| 4,395,003 A | * | 7/1983 | Coutin ...................... | 244/137.4 |
| 4,431,350 A | | 2/1984 | Abrahamson ................. | 408/11 |
| 4,583,461 A | | 4/1986 | Weber ....................... | 102/489 |
| 4,589,615 A | * | 5/1986 | Walker, Jr. .................. | 244/137.4 |
| 4,651,648 A | | 3/1987 | Alon ........................ | 102/387 |
| 4,736,669 A | | 4/1988 | Long et al. | |
| 4,842,218 A | | 6/1989 | Groutage et al. ............. | 244/3.28 |
| 4,926,740 A | * | 5/1990 | Griffin et al. ............... | 89/1.819 |
| 5,148,734 A | * | 9/1992 | Lilly ........................ | 89/1.815 |
| 5,229,538 A | * | 7/1993 | McGlynn et al. ............. | 89/1.56 |
| 5,476,238 A | | 12/1995 | Parker | |
| 5,884,569 A | | 3/1999 | Donovan ..................... | 110/346 |
| 6,543,328 B1 | * | 4/2003 | Plummer et al. ............. | 89/1.54 |
| 6,655,254 B1 | * | 12/2003 | Nicodemus .................. | 89/1.54 |
| 6,688,209 B1 | | 2/2004 | McMahon et al. | |
| 7,156,347 B2 | * | 1/2007 | Lam et al. .................. | 244/137.4 |
| 7,503,525 B1 | * | 3/2009 | Lam et al. .................. | 244/137.4 |

FOREIGN PATENT DOCUMENTS

| | | |
|---|---|---|
| AT | 308 552 B | 7/1973 |
| DE | 25 43 479 A1 | 4/1977 |
| WO | WO 03/027598 A1 | 4/2003 |

OTHER PUBLICATIONS

PCT, Notification of Transmittal of the International Search Report and the Written Opinion of the International Searching Authority, or the Declaration, International Application No. PCT/US2010/026736, 17 pages, Sep. 14, 2010.

* cited by examiner

*Primary Examiner* — Michael J. Carone
*Assistant Examiner* — Jonathan C Weber
(74) *Attorney, Agent, or Firm* — Renner, Otto, Boisselle & Sklar, LLP

(57) ABSTRACT

According to one embodiment, an apparatus comprises a structural body, one or more attachment couplers, and an adjustable store coupler. The structural body comprises a cylindrical portion and one or more end portions coupled to the cylindrical portion. The attachment couplers are configured to be coupled to a bomb rack of an aircraft. The adjustable store coupler has attachment points arranged in a substantially linear manner. The attachment points are configured to couple one or more store systems to the adjustable store coupler.

17 Claims, 4 Drawing Sheets

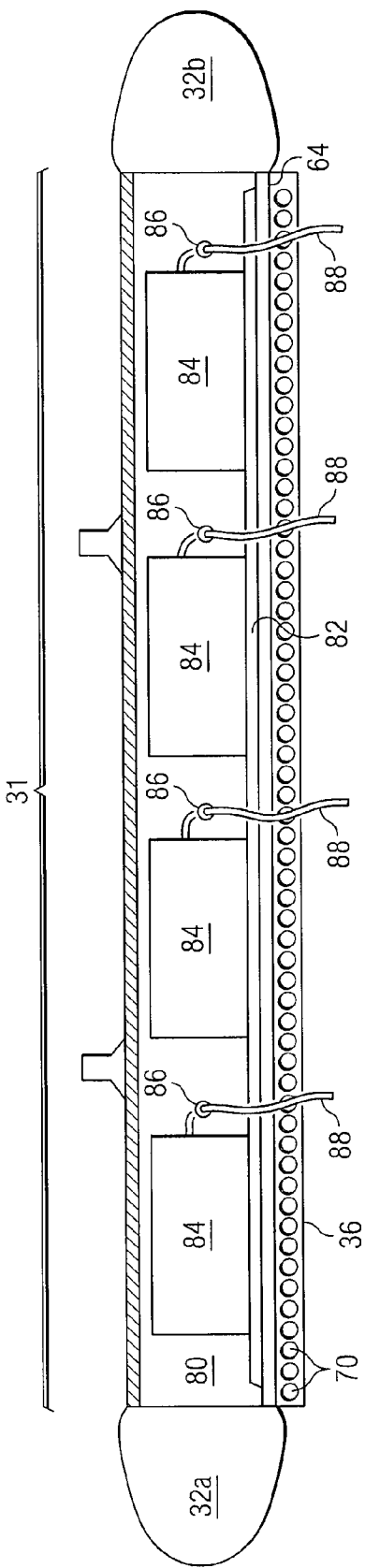
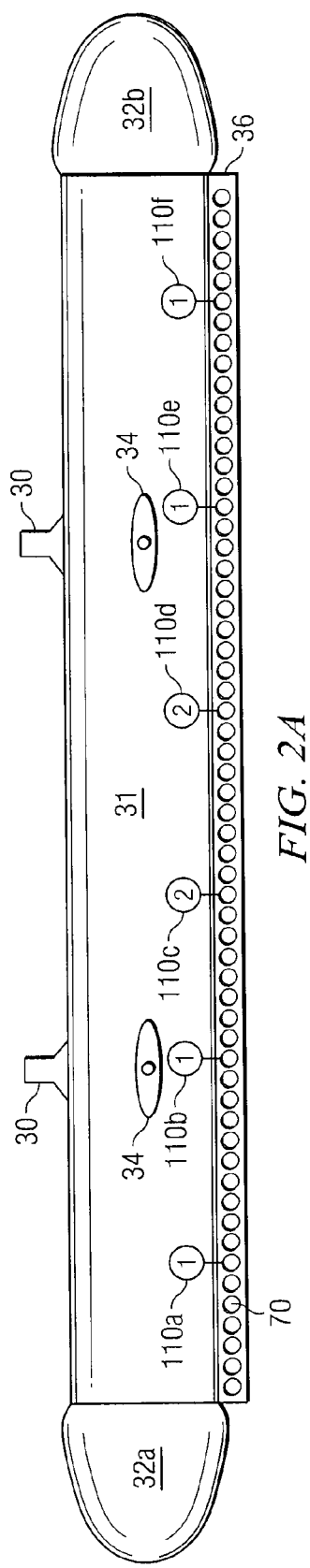
FIG. 1C
FIG. 2A

US 8,141,468 B2

ADJUSTABLE BOMB CARRIER

TECHNICAL FIELD

This invention relates generally to the field of store carriage systems and more specifically to an adjustable bomb carrier.

BACKGROUND

Bombs and other stores may be transported via aircraft in order to be deployed. Attaching the stores to the aircraft involves a variety of considerations, such as the type of store being transported. In certain situations, known techniques for attaching bombs and other stores to an aircraft are not satisfactory.

SUMMARY OF THE DISCLOSURE

In accordance with the present invention, disadvantages and problems associated with previous techniques for transporting stores may be reduced or eliminated.

According to one embodiment, an apparatus comprises a structural body, one or more attachment couplers, and an adjustable store coupler. The structural body comprises a cylindrical portion and one or more end portions coupled to the cylindrical portion. The attachment couplers are configured to be coupled to a bomb rack of an aircraft. The adjustable store coupler has attachment points arranged in a substantially linear manner. The attachment points are configured to couple one or more store systems to the adjustable store coupler.

Certain embodiments of the invention may provide one or more technical advantages. A technical advantage of one embodiment may be that an adjustable store coupler of an apparatus can be used to transport one or more of a variety of stores. The adjustable store coupler may have a number of attachment points that may be used to transport, for example, one larger bomb or multiple smaller bombs. Another technical advantage of one embodiment may be that a structural body of the apparatus may have an enclosure into which a tray may be placed. The tray may support one or more modules that may be used by the stores transported by the apparatus.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 1C illustrates a side view of a portion of the embodiment of the apparatus of FIG. 1A;

FIG. 2A illustrates one embodiment of a structural body that may be used with the apparatus of FIG. 1A;

DETAILED DESCRIPTION OF THE DRAWINGS

Figure 1A:
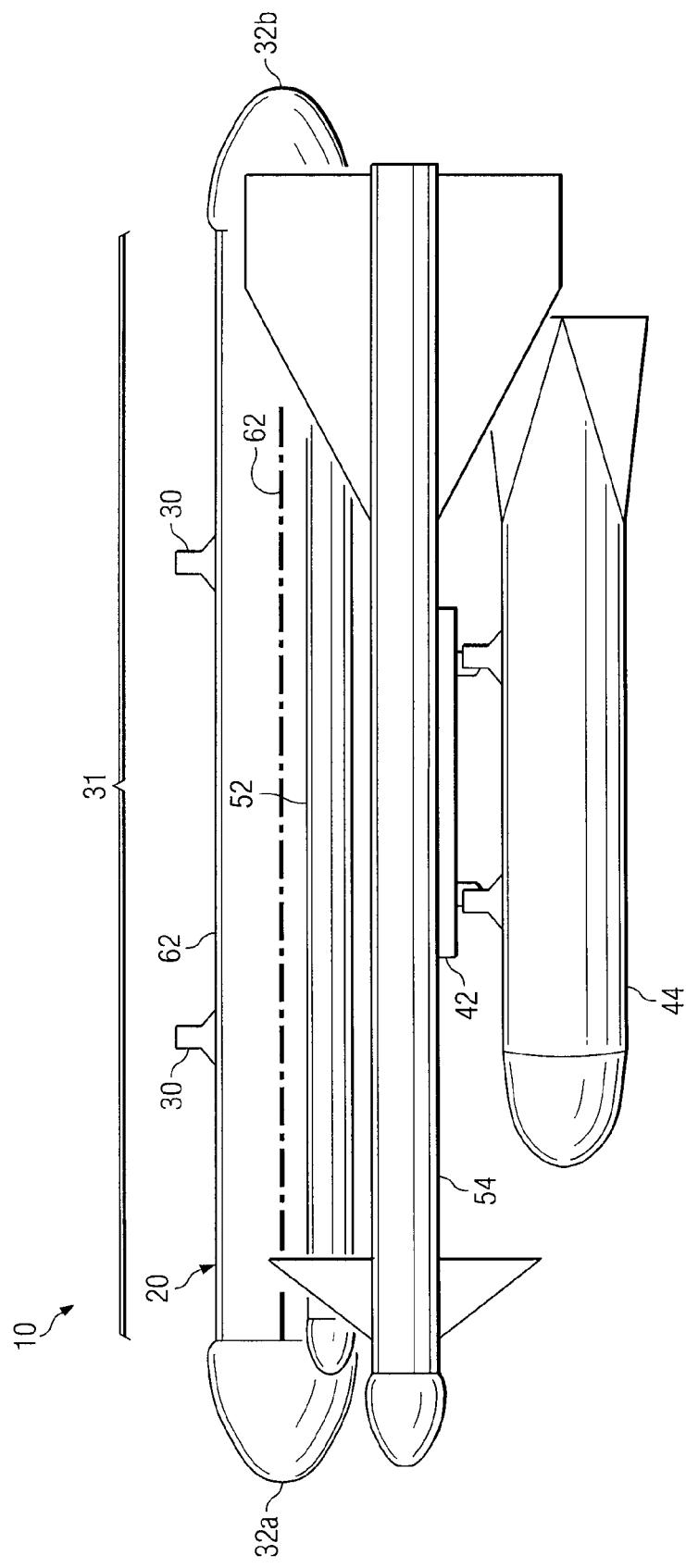
FIG. 1A illustrates a side view of one embodiment of an apparatus that may be used to couple one or more stores to an aircraft.
Figure 2B:
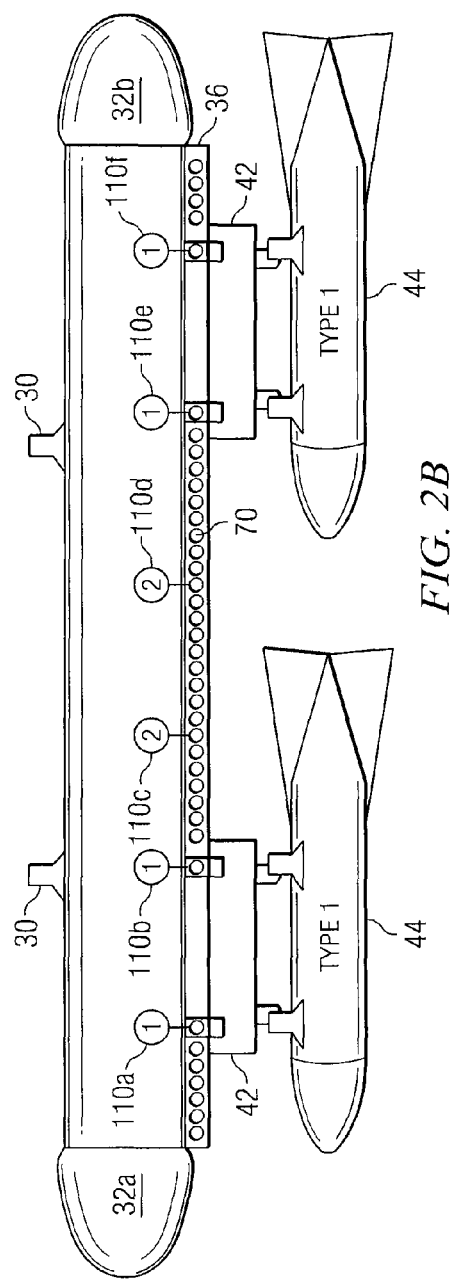
FIG. 2B illustrates the structural body of FIG. 2A configured to carry two bombs.
Figure 2C:
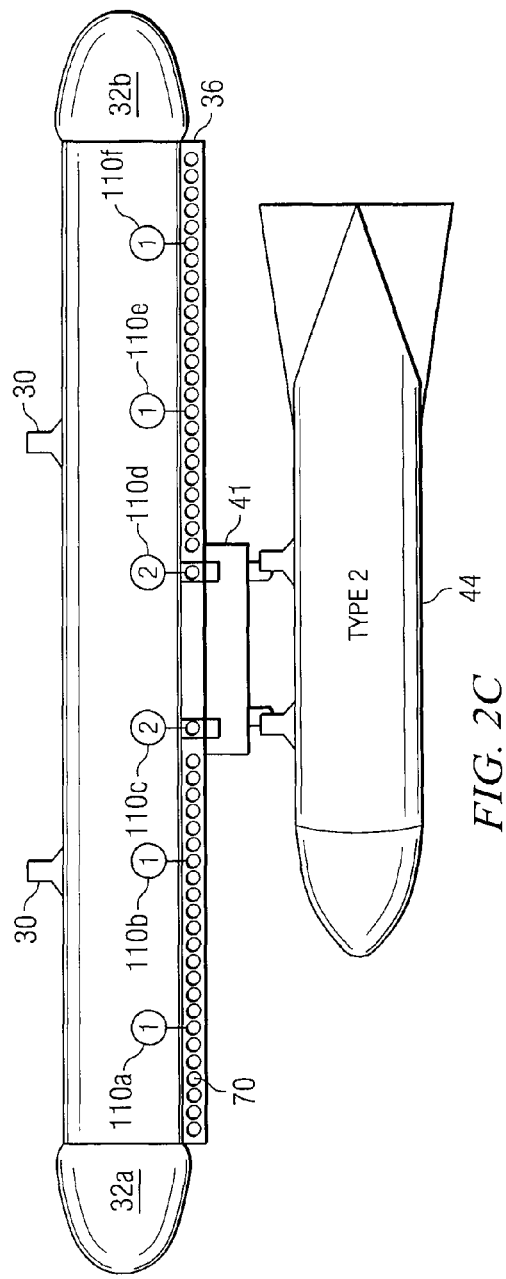
FIG. 2C illustrates the structural body of FIG. 2A configured to carry one bomb.

Embodiments of the present invention and its advantages are best understood by referring to FIGS. 1A and 2C of the drawings, like numerals being used for like and corresponding parts of the various drawings.

Figure 1B:
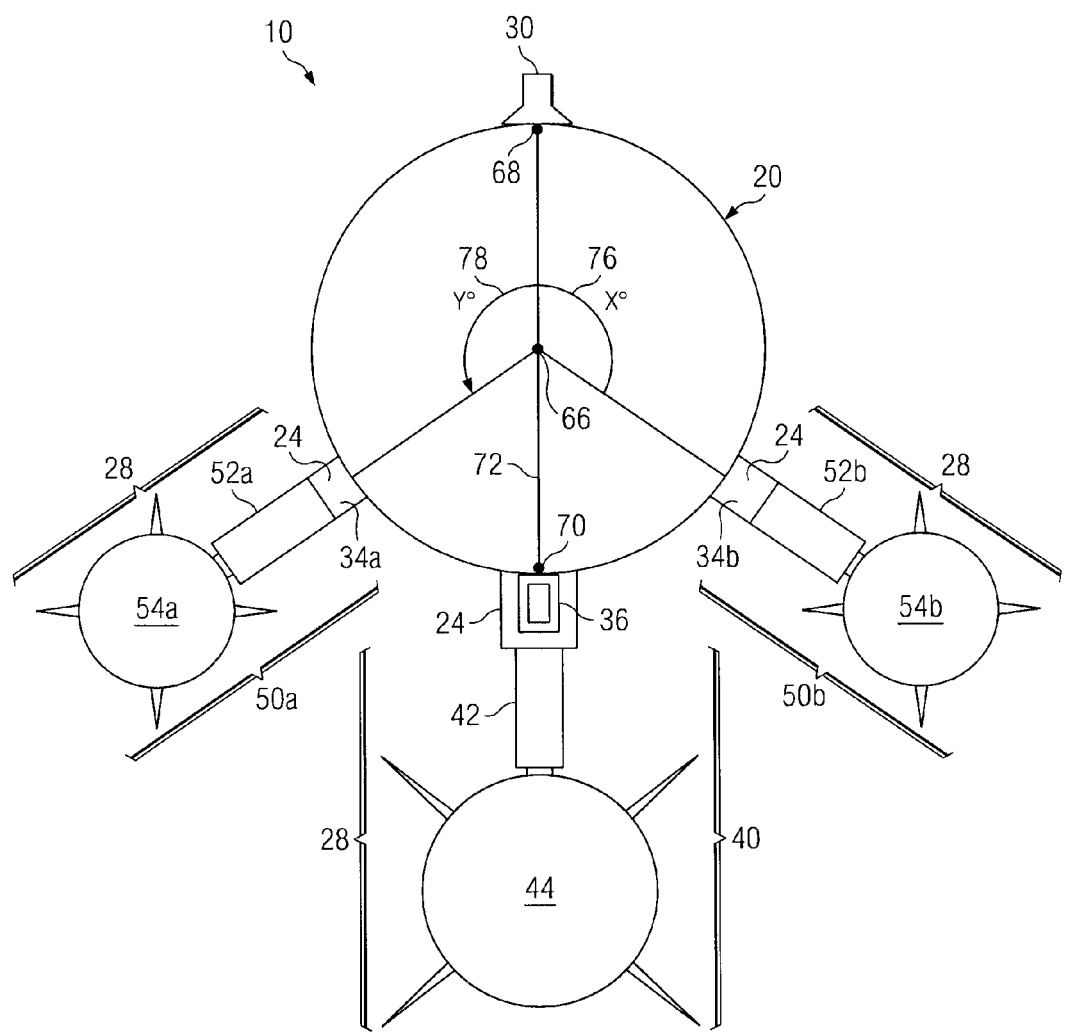
FIG. 1B illustrates a front view of the embodiment of the apparatus of FIG. 1A.

FIGS. 1A through 1C illustrate one embodiment of an apparatus 10 that may be used to couple stores to an aircraft. FIG. 1A illustrates a side view of apparatus 10, FIG. 1B illustrates a front view of apparatus 10, and FIG. 1C illustrates a side view of a portion of apparatus 10.

As illustrated in FIG. 1B, apparatus 10 includes a structural body 20, one or more store couplers 24, one or more store systems 28, and one or more attachment couplers 30 coupled as shown. Store couplers 24 comprise missile launcher couplers 34 (34a and/or 34b) and an adjustable store coupler 36. Store systems 28 comprise a bomb system 40 and a missile system 50. Bomb system 40 includes a bomb ejector 42 and one or more bombs 44 coupled as shown. Missile system 50 includes a missile launcher 52 and a missile 54 coupled as shown.

The components of apparatus 10 may comprise any suitable rigid material, for example, metal. The components may be coupled together using any suitable technique (such as welding and/or bonding) and/or coupling devices. Examples of coupling devices include lugs, hooks, screws, shackles, clamps, fasteners, latches, nails, and rivets.

In certain embodiments, structural body 20 provides support for carrying one or more stores. Structural body 20 comprises a cylindrical portion 31 and one or more end portions 32 (32a and/or 32b) coupled as shown. Cylindrical portion 31 has a substantially cylindrical shape of any suitable length and diameter. For example, the length may be 3 to 5 feet, 5 to 6 feet, 6 to 8 feet, 8 to 10 feet, or over 10 feet long. The diameter may be to 7 inches, 7 to 8 inches, 8 to 9 inches or over 9 inches in diameter. Cylindrical portion 31 may be hollow, and may be formed from aluminum or steel either as a riveted sheet or a tube. An end portion 32 may have a curved, aerodynamic shape. End portion 32 may be coupled to cylindrical portion 31 and may be decoupled to allow for access to the interior of cylindrical portion 31.

In certain embodiments, couplers 24 and/or 30 may be coupled to any suitable location of cylindrical portion 31. The following is provided to aid in the description of the locations of cylindrical portion 31. Cylindrical portion 31 has a center axis 60 (FIG. 1A), as well as a top line 62 (FIG. 1A) and a bottom line 64 (FIG. 1C) substantially parallel to center axis 60. Center axis 60, top line 62, and bottom line 64 intersect a cross section 65 (FIG. 1B) of cylindrical portion 31 at points, and may be regarded as "defining" the points. As illustrated in FIG. 1B, center axis 60 defines a center point 66, top line 62 defines a top point 68, and bottom line 64 defines a bottom point 70. Center point 66 and top point 68 define a center line 72 of cross-section 65.

As illustrated in FIG. 1B, a first angle 76 may be defined by a first amount of rotation x from center line 72 about center point 66. A second angle may be defined by a second amount of rotation y from center line 72 about center point 66. Rotation y may have any suitable relationship to rotation x, such as y=−x. Rotation x may have any suitable value, such as less than 90 degrees, 90 to 110 degrees, 110 to 135 degrees, or 135 to 150 degrees.

In certain embodiments, attachment couplers 30 are configured to couple structural body 20 to a bomb rack of an aircraft, which may be located on the underside of a wing of the aircraft. Attachment couplers 30 may comprise any suitable coupling devices, and may be located along a top line 62 of cylindrical portion 31. The placement of attachment couplers 30 may be selected to satisfy certain conditions. As an example, attachment couplers 30 may be spaced such that they fit coupling devices of the bomb rack. For example, if the bomb rack has coupling devices that are approximately 30 inches apart, the couplers 30 may also be approximately 30 inches apart. As another example, attachment couplers 30 may be placed such that apparatus 10 is balanced when apparatus 10 is coupled to an aircraft. As another example, attachment couplers 30 may be placed such that store systems 28 can operate properly.

In certain embodiments, a store coupler 24 couples a store system 28 to cylindrical portion 31. In the illustrated embodiment, store couplers 24 may include an adjustable store coupler 36 and/or a missile launcher coupler 34, and store systems 28 include a bomb system 40 and/or a missile system 50.

In certain embodiments, adjustable store coupler 36 may be used to couple one or more of any of a variety of stores to cylindrical portion 31. In the illustrated embodiment, adjustable store coupler 36 couples bomb system 40. Adjustable store coupler 36 has a plurality of attachment points 70 arranged in a substantially linear manner. Attachment points 70 are configured to couple one or more store systems to store coupler 36. In certain embodiments, attachment point 70 may be spaced to match coupling devices of standard store systems 28. For example, a standard store system 28 may have coupling devices that are separated by a standard distance. The attachment points 70 may also be separated by the standard distance.

Attachment point 70 may comprise any suitable feature or coupling device that may be used to couple store systems 28 to adjustable store coupler 36. In certain examples, an attachment point 70 may comprise attachment apertures defined by a surface of store coupler 36. That is, the attachment points 70 may be holes.

In certain embodiments, bomb system 40 comprises one or more bomb ejectors 42 and one or more bombs 44. A bomb ejector 42 is configured to couple to a bomb 44 and release the bomb 44. Examples of bomb ejectors include any bomb release unit (BRU) bomb ejector, such as a BRU-20 or a BRU-12/14/15/series bomb ejector, or an MK8 bomb release unit.

In certain embodiments, missile launcher coupler 34 is configured to couple a missile launcher 52 to cylindrical portion 31. Missile launcher 52 may comprise any suitable missile launcher, for example, a LAU series (for example, an LAU-7 or LAU-127) launcher or a single rail hellfire/joint air-to-ground missile (JAGM) launcher. In the illustrated embodiment, missile system 50 comprises one or more missile launchers 52 and one or more missiles 54.

Although the illustrated embodiment includes bomb systems 40 and missile systems 50, store systems 28 may comprise any suitable store system that transports stores. Other examples of store systems include pods for machine guns, chaf, flare, or rockets.

A coupler 24, 30, 34, and/or 36 may be coupled to any suitable location of cylindrical portion 31. The placement of attachment couplers 24, 30, 34, and/or 36 may be selected to satisfy certain conditions. As an example, couplers 24, 30, 34, and/or 36 may be placed such that apparatus 10 is balanced when apparatus 10 is coupled to an aircraft. As another example, couplers 24, 30, 34, and/or 36 may be placed such that store systems 28 can operate properly.

In the illustrated embodiment, aperture couplers 30 are located along top line 62. Adjustable store coupler is located along bottom line 64. Missile launcher couplers 34 are located at angle x and angle y, where angle x is approximately 135 degrees, and angle y is the opposite of angle x.

Other suitable arrangements may be used. For example, one or more missile launcher couplers 34 may be replaced by one or more additional adjustable store couplers 36. As another example, missile launcher 34 may replace adjustable store coupler 36. As another example, apparatus 10 may have more of fewer store couplers 24 configured to carry more or fewer store systems 28. As another example, angle x may be greater or smaller than 135 degrees.

As illustrated in FIG. 1C, in certain embodiments, cylindrical portion 31 encloses a chamber 80. A tray 82, such as a sliding tray, may be removably disposed within chamber 80. For example, an end portion 32 may be removed, and tray 82 may slide into or out of chamber 80. Tray 82 may be configured to support one or more modules 84. A module 84 may operate to perform functions used by store systems 28. For example, one or more modules 84 may include electronics, sensors, pneumatics, or any other devices that perform operations for store subsystems 28.

In certain embodiments, the surface of cylindrical portion 38 may define one or more umbilical apertures 86. That is, the surface may have one or more holes. An umbilical aperture 86 may be configured to allow an umbilical 88 from a module 84 pass through to the exterior of cylindrical portion 31 to a subsystem 28. An umbilical 86 may allow module 84 to communicate with a corresponding store system 28. Signals, power, pressure, or fluid may be transmitted between module 84 and corresponding store system 28.

Apparatus 10 may be used with any suitable aircraft. Examples of aircraft include bombers (for example, B-1, B-2, and B-52 bombers).

FIGS. 2A through 2C illustrate one embodiment of a structural body 20 configured to carry different stores and that may be used with the apparatus of FIG. 1A. FIG. 2A illustrates structural body 20, FIG. 2B illustrates structural body 20 configured to carry two bombs, and FIG. 2C illustrates structural body 20 configured to carry one bomb.

In certain embodiments, cylindrical portion 31 may include markings 110 (110a, . . . , 110f) that indicate the attachment points 70 for particular types of store. In the illustrated examples, a Type 1 bomb is a smaller bomb, and a Type 2 bomb is a larger bomb. In the illustrated example, markings 110a and 110b indicate attachment points 70 for a first Type 1 bomb, and markings 110e and 110f indicate attachment point 70 for a second Type 1 bomb. Markings 110c and 110d indicate attachment points 70 for a Type 2 bomb.

Modifications, additions, or omissions may be made to the apparatuses presented herein without departing from the scope of the invention. The components of the apparatuses may be integrated or separated. Moreover, the operations of the apparatuses may be performed by more, fewer, or other components. As used in this document, "each" refers to each member of a set or each member of a subset of a set.

Modifications, additions, or omissions may be made to the methods presented herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:
1. An apparatus comprising:
a structural body comprising:
  a cylindrical portion enclosing a chamber and having a substantially cylindrical shape; and
  one or more end portions coupled to the cylindrical portion;
one or more attachment couplers coupled to the cylindrical portion, each attachment coupler configured to be coupled to a bomb rack of an aircraft;
an adjustable store coupler coupled to the cylindrical portion, the adjustable store coupler having a plurality of apertures arranged in a substantially linear manner, the plurality of apertures comprising a first aperture, a second aperture, a third aperture, and a fourth aperture, the plurality of apertures configured to couple one or more store systems to the adjustable store coupler;
a first store system, the first store system comprising first and second attachment members, the first and second attachment members of the first store system coupled to first and second apertures of the plurality of apertures;
a second store system, the second store system comprising third and fourth attachment members, the third and fourth attachment members of the second store system coupled to third and fourth apertures of the plurality of apertures; and
a tray removably disposed within the chamber, the tray configured to support one or more modules comprising electronics that perform one or more operations for the support systems.

2. The apparatus of claim 1, the plurality of apertures comprising at least one attachment aperture defined by a surface of the adjustable store coupler.

3. The apparatus of claim 1, the one or more store systems comprising one or more bomb ejectors, each bomb ejector configured to:
couple to a bomb; and
release the bomb.

4. The apparatus of claim 1, further comprising one or more missile launcher couplers, each missile launcher coupler configured to couple a missile launcher to the cylindrical portion.

5. The apparatus of claim 1:
the cylindrical portion having a top line and a bottom line substantially parallel to a center axis of the cylindrical portion;
the one or more attachment couplers coupled along the top line; and
the adjustable store coupler coupled along the bottom line.

6. The apparatus of claim 1:
the cylindrical portion having a top line substantially parallel to a center axis of the cylindrical portion, the center axis defining a center point of a cross-section of the cylindrical portion, the top line defining a top point of the cross-section, the center point and the top point defining a center line of the cross-section, a first angle defined by a first amount of rotation from the center line about the center point, a second angle defined by a second amount of rotation from the center line about the center point, the first amount of rotation less than 150 degrees, the second amount of rotation the opposite of the first amount of rotation;
the apparatus further comprising:

a first additional store coupler coupled to the cylindrical portion at the first angle; and
a second additional store coupler coupled to the cylindrical portion at the second angle.

7. The apparatus of claim 1:
the cylindrical portion enclosing a chamber; and
the cylindrical portion having a surface defining one or more umbilical apertures, each umbilical aperture configured to allow an umbilical from the chamber pass through to the exterior of the cylindrical portion.

8. An apparatus comprising:
a structural body comprising:
  a cylindrical portion enclosing a chamber and having a substantially cylindrical shape; and
  one or more end portions coupled to the cylindrical portion;
one or more attachment couplers coupled to the cylindrical portion, each attachment coupler configured to be coupled to a bomb rack of an aircraft;
an adjustable store coupler coupled to the cylindrical portion, the adjustable store coupler having a plurality of attachment apertures arranged in a substantially linear manner, the plurality of apertures comprising a first aperture, a second aperture, a third aperture, and a fourth aperture, the plurality of attachment apertures configured to receive:
  a first store system by coupling first and second attachment members of the first store system to first and second apertures of the plurality of attachment apertures, and
  a second store system by coupling third and fourth attachment members of the second store system to third and fourth apertures of the plurality of attachment apertures; and
a tray removably disposed within the chamber, the tray configured to support one or more modules comprising electronics that perform one or more operations for the support systems.

9. The apparatus of claim 8, the one or more bomb systems comprising one or more bomb ejectors, each bomb ejector configured to:
couple to a bomb; and
release the bomb.

10. The apparatus of claim 8, further comprising one or more missile launcher couplers, each missile launcher coupler configured to couple a missile launcher to the cylindrical portion.

11. The apparatus of claim 8:
the cylindrical portion having a top line and a bottom line substantially parallel to a center axis of the cylindrical portion;
the one or more attachment couplers coupled along the top line; and
the adjustable store coupler coupled along the bottom line.

12. The apparatus of claim 8:
the cylindrical portion having a top line substantially parallel to a center axis of the cylindrical portion, the center axis defining a center point of a cross-section of the cylindrical portion, the top line defining a top point of the cross-section, the center point and the top point defining a center line of the cross-section, a first angle defined by a first amount of rotation from the center line about the center point, a second angle defined by a second amount of rotation from the center line about the center point, the first amount of rotation less than 150 degrees, the second amount of rotation the opposite of the first amount of rotation;

the apparatus further comprising:
a first additional store coupler coupled to the cylindrical portion at the first angle; and
a second additional store coupler coupled to the cylindrical portion at the second angle.

13. The apparatus of claim 8:
the cylindrical portion enclosing a chamber; and
the cylindrical portion having a surface defining one or more umbilical apertures, each umbilical aperture configured to allow an umbilical from the chamber pass through to the exterior of the cylindrical portion.

14. An apparatus comprising:
a structural body comprising:
  a cylindrical portion enclosing a chamber and having a substantially cylindrical shape, the cylindrical portion having a top line and a bottom line substantially parallel to a center axis of the cylindrical portion; and
  one or more end portions coupled to the cylindrical portion;
one or more attachment couplers coupled to the cylindrical portion along the top line, each attachment coupler configured to be coupled to a bomb rack of an aircraft;
an adjustable store coupler coupled to the cylindrical portion along the bottom line, the adjustable store coupler having a plurality of attachment apertures arranged in a substantially linear manner, the plurality of apertures comprising a first aperture, a second aperture, a third aperture, and a fourth aperture, the plurality of attachment apertures configured to receive:
  a first store system by coupling first and second attachment members of the first store system to first and second apertures of the plurality of attachment apertures of the adjustable store coupler, and
  a second store system by coupling third and fourth attachment members of the second store system to third and fourth apertures of the plurality of attachment apertures of the adjustable store coupler;
one or more missile launcher couplers coupled to the cylindrical portion, each missile launcher coupler configured to couple a missile launcher to the cylindrical portion; and
a tray removably disposed within the chamber, the tray configured to support one or more modules comprising electronics that perform one or more operations for the support systems.

15. The apparatus of claim 14, the one or more bomb systems comprising one or more bomb ejectors, each bomb ejector configured to:
couple to a bomb; and
release the bomb.

16. The apparatus of claim 14:
the center axis defining a center point of a cross-section of the cylindrical portion, the top line defining a top point of the cross-section, the center point and the top point defining a center line of the cross-section, a first angle defined by a first amount of rotation from the center line about the center point, a second angle defined by a second amount of rotation from the center line about the center point, the first amount of rotation less than 150 degrees, the second amount of rotation the opposite of the first amount of rotation;
the apparatus further comprising:
  a first additional store coupler coupled to the cylindrical portion at the first angle; and
  a second additional store coupler coupled to the cylindrical portion at the second angle.

17. The apparatus of claim 14:
the cylindrical portion enclosing a chamber; and
the cylindrical portion having a surface defining one or more umbilical apertures, each umbilical aperture configured to allow an umbilical from the chamber pass through to the exterior of the cylindrical portion.

\* \* \* \* \*